United States Patent
Beard, III et al.

(10) Patent No.: US 10,106,215 B2
(45) Date of Patent: *Oct. 23, 2018

(54) ONE-DIMENSIONAL CLIMBING VEHICLE WITH RESILIENT GUIDE MECHANISM

(71) Applicants: James Walter Beard, III, Cookeville, TN (US); Stephen Lee Canfield, Cookeville, TN (US); David Andrew Bryant, Lebanon, TN (US)

(72) Inventors: James Walter Beard, III, Cookeville, TN (US); Stephen Lee Canfield, Cookeville, TN (US); David Andrew Bryant, Lebanon, TN (US)

( * ) Notice: Subject to any disclaimer, the term of this patent is extended or adjusted under 35 U.S.C. 154(b) by 150 days.

This patent is subject to a terminal disclaimer.

(21) Appl. No.: 14/720,430

(22) Filed: May 22, 2015

(65) Prior Publication Data
US 2015/0336625 A1  Nov. 26, 2015

Related U.S. Application Data

(60) Provisional application No. 62/002,821, filed on May 24, 2014.

(51) Int. Cl.
*B62D 61/10* (2006.01)
*B62D 61/00* (2006.01)
*F16L 55/00* (2006.01)
*B60B 19/00* (2006.01)
*F16L 101/30* (2006.01)

(52) U.S. Cl.
CPC ............ *B62D 61/10* (2013.01); *B62D 61/00* (2013.01); *F16L 55/00* (2013.01); *B60B 19/00* (2013.01); *B60B 19/006* (2013.01); *F16L 2101/30* (2013.01)

(58) Field of Classification Search
CPC ........ B62D 61/10; B62D 61/00; B60B 19/00; B60B 19/006; F16L 55/00; F16L 2101/30
See application file for complete search history.

(56) References Cited

U.S. PATENT DOCUMENTS

| | | | | |
|---|---|---|---|---|
| 2,934,157 A | * | 4/1960 | Harp | B62D 49/0607 180/209 |
| 5,284,096 A | * | 2/1994 | Pelrine | B62D 49/04 104/138.2 |

(Continued)

*Primary Examiner* — Faye M Fleming

(57) ABSTRACT

This patent discloses a climbing vehicle capable of high payload to weight ratio and capable of climbing surfaces with geometric variations and traveling along a single dimension. More specifically, this invention applies to a vehicle well adapted to climbing non-planar surfaces such as pipes or other structural members while traveling along a single dimension, for example traveling parallel to the axis of the pipe. The climbing vehicle makes contact with the climbing surface through drive wheels and a trailing arm. The adhering members are aligned with the primary axis and are rigidly attached or contained in a suspension that is able to conform to a large range of surface irregularities while providing push and pulling forces between the adhering members and the climbing vehicle chassis to uniformly distribute the climbing loads on the adhering members. The result is a climbing machine that can accommodate large surface irregularities while maximizing the climbing payload with a minimum number and size of adhering members.

15 Claims, 4 Drawing Sheets

Basic form of the invention

(56) References Cited

U.S. PATENT DOCUMENTS

| | | | |
|---|---|---|---|
| 9,428,231 B2* | 8/2016 | Beard | B62D 55/02 |
| 2001/0047895 A1* | 12/2001 | De Fazio | B62D 57/024 |
| | | | 180/22 |
| 2011/0050374 A1* | 3/2011 | Dvorak | A63H 17/42 |
| | | | 335/219 |

* cited by examiner

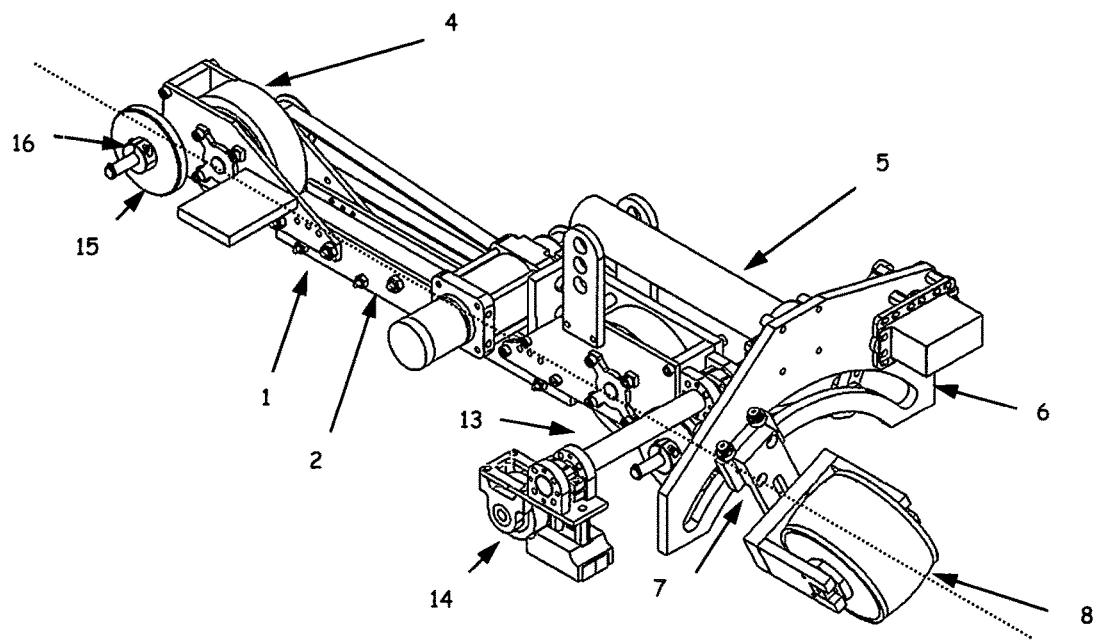
Fig. 1: Basic form of the invention

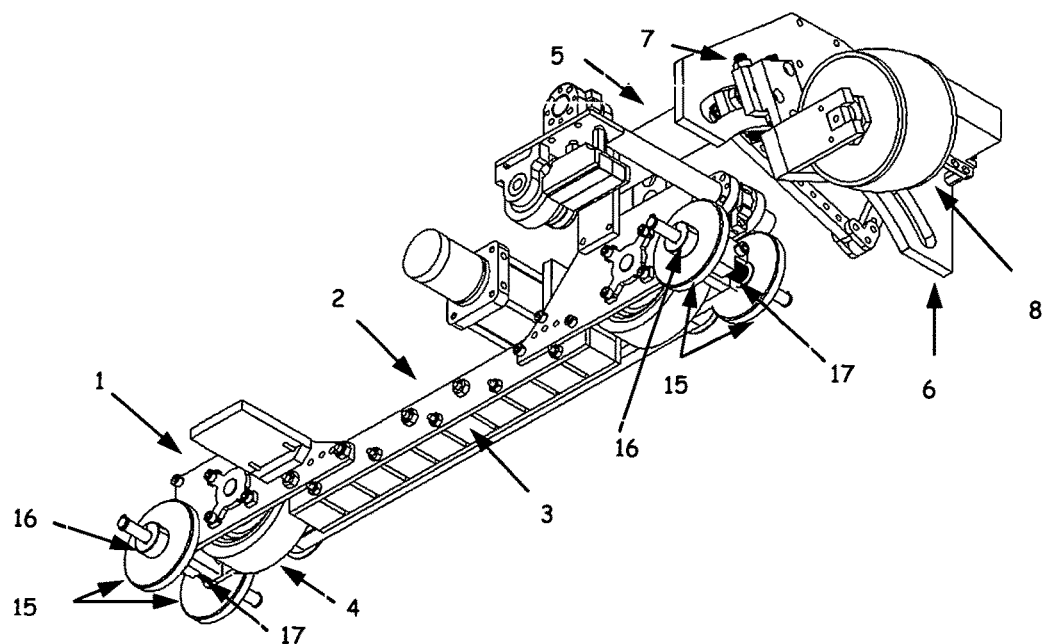
Fig. 2: Basic form of the invention
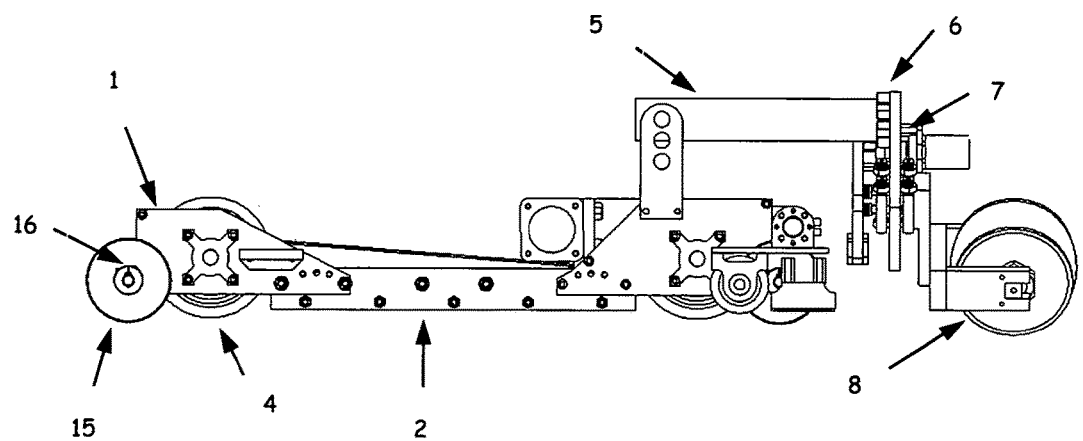
Fig. 3: Basic form of the invention side view

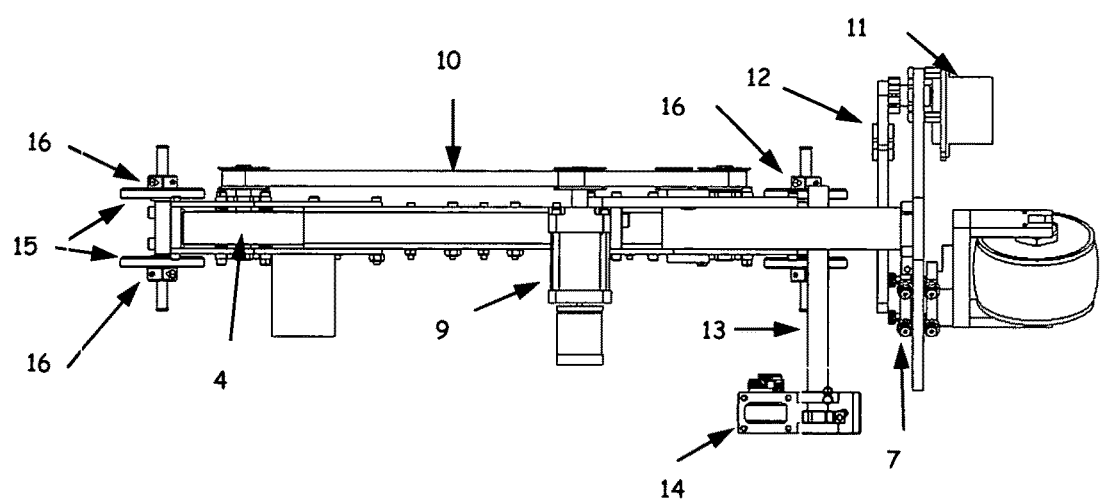
Fig. 4: Basic form of the invention top view

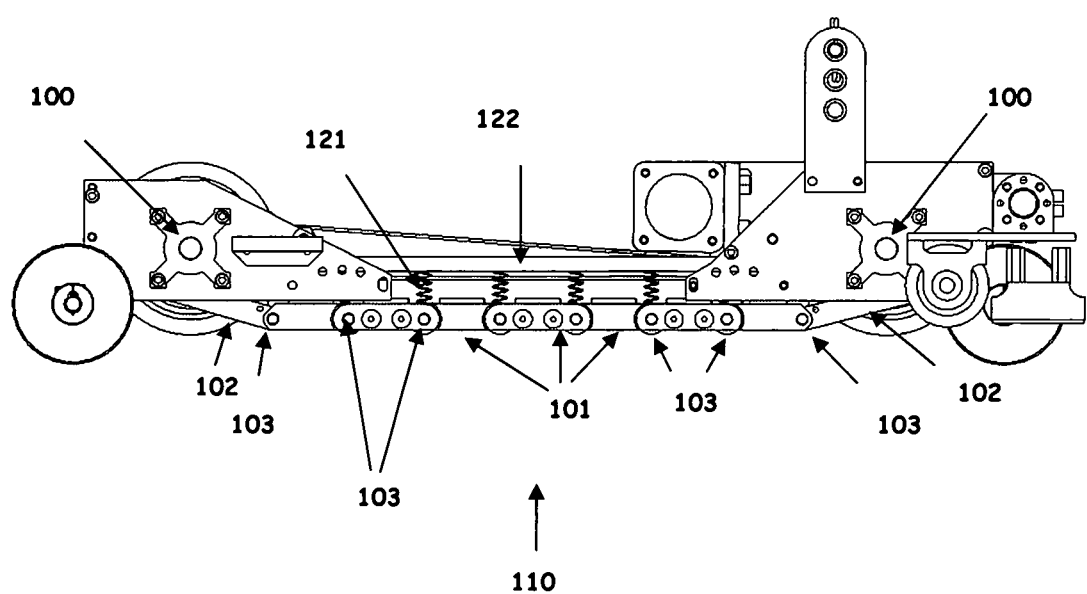
Fig. 5: Side view showing the resilient runner mechanism

ONE-DIMENSIONAL CLIMBING VEHICLE WITH RESILIENT GUIDE MECHANISM

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention applies to a category of self-propelled, climbing vehicles that primarily make use of wheels or endless tracks to provide propulsion along a climbing surface, but could employ legs. More specifically, this invention applies to a vehicle well adapted to climbing non-planar surfaces such as pipes or other structural members while traveling along a single dimension, for example traveling parallel to the axis of the pipe. For this purpose, the term climbing vehicle refers to a vehicle that is capable of traversing a surface horizontally or vertically or in some inclined or inverted position relative to the earth horizon. Further, it is intended that the climbing vehicle is able to accommodate irregularity in the climbing surface including convex or concave regions. Such climbing vehicles may be used to conduct remote operations such as inspection, maintenance, or manufacturing in environments that pose difficulty or danger for human operation. These climbing vehicles could also be used in a wide variety of applications including power production, civil structures, or shipbuilding. A variety of climbing vehicles have been proposed to operate in these conditions. The methods of achieving mobility for climbing vehicles include but are not limited to legged locomotion, endless tracks or wheeled devices. Patent literature demonstrating examples of climbing vehicles employing endless tracks include U.S. Pat. No. 3,960,229, U.S. Pat. No. 4,789,037, U.S. Pat. No. 4,828,059, U.S. Pat. No. 5,366,038, U.S. Pat. No. 5,435,405, U.S. Pat. No. 5,487,440, U.S. Pat. No. 5,884,642, U.S. Pat. No. 5,894,901, U.S. Pat. No. 6,889,783, U.S. Pat. No. 7,498,542 B2, U.S. Pat. No. 7,775,312, and US application publication numbers US 2012/0111649 A1, US 2012/0116583 A1, US 2012/0111843 A1. Patent literature demonstrating examples of climbing vehicles employing wheels include U.S. Pat. No. 3,690,393, U.S. Pat. No. 3,810,515, U.S. Pat. No. 4,010,636, U.S. Pat. No. 5,049,218, U.S. Pat. No. 5,355,807, U.S. Pat. No. 5,853,655, U.S. Pat. No. 6,000,484, U.S. Pat. No. 6,564,815, U.S. Pat. No. 6,596,22, U.S. Pat. No. 6,595,152, U.S. Pat. No. 6,627,004 B1 2003, U.S. Pat. No. 6,688,938, U.S. Pat. No. 6,793,026, U.S. Pat. No. 6,886,651, and US application publication numbers US 2009/0078484, U.S. Pat. No. 7,309,464 B2, US 2010/0212983 and US 2010/017610. The majority of the wheeled-type climbing vehicles employ magnets in the wheel portion as demonstrated in U.S. Pat. No. 2,694,164. Advanced features in magnetic wheels have been demonstrated, for example as in U.S. Pat. No. 6,125,955. The use of wheels in climbing platforms provides several advantages, including relative simplicity in their design and actuation, and constant pitch properties that contribute to uniform motion transfer. The primary difficulty in using a wheeled-type platform for climbing is that the wheels require theoretical point contact with the surface to enable efficient rolling. This point contact limits the region in which adhering elements can connect or be in close proximity to the climbing surface. Adhering elements may be made of magnets, suction cups, adhesive or other device that can create an adhering force to the climbing surface. The size of the contact region for adhering members is generally related to the amount of adhering force that can be generated.

The size of the available contact region for wheeled climbing vehicles can be increased by increasing the number of wheels in contact with the climbing surface to yield an increase in the overall adhering force of the vehicle. For example, when magnets are used as adhering members, they may be embedded in the wheel to rotate with the wheel (U.S. Pat. No. 2,694,164), or they may be suspended to the wheel axis but have the ability to move circumferentially about the wheel (U.S. Pat No. 0,212,983). While the overall adhering force of the vehicle can be increased by increasing the number of wheels in contact with the climbing surface, this raises several technical difficulties in the design and implementation of these systems. First, as the number of wheels increases, the complexity of the system increases. Second, as the number of wheels in contact with the climbing surface increases beyond a minimal number, for example three to provide stability when the contact surface is non-planar, wheel suspensions are required to ensure wheel contact with the surface. Third, as the number of wheels in contact with the surface increases, the kinematic requirements for steering increase, or slipping is introduced into the system which decreases efficiency. For these reasons, climbing vehicles with large numbers of wheels that have the adhering members integrated in the wheels are seldom seen in practice.

More commonly, wheeled vehicles that employ adhering members integrated into the wheels employ a reduced or minimal number of wheels in wheel-based climbing systems. This can be seen in several examples in the literature including U.S. Pat. No. 6,627,004, U.S. Pat. No. 6,793,026 and U.S. Pat. No. 7,625,827. These typically employ either three wheels or four wheels. Three wheel systems enjoy the advantage of not requiring any type of suspension to insure contact of each wheel with the climbing surface when climbing on non-planar terrain. Four wheel systems are shown to incorporate a simple suspension design to maintain contact between the wheels and the climbing surface.

When a reduced number of wheels, for example three or four, are employed in a wheel-based climbing system, the forces required for equilibrium directed away from the surface will at times during operation be concentrated on a single wheel and associated adhering member. This concentration of forces on a single wheel results in a reduced payload capacity of the climbing vehicle. The payload capacity of climbing vehicles is one of the primary performance metrics in the design of such a vehicle. Thus, wheel-type climbing robot vehicles that place the adhering members in our about the wheels have limitations in the payload capacity.

Alternatively, the literature of wheel-type climbing robots demonstrates inventions that place the adhering members in the frame or chassis of the vehicle. An example of this is given in U.S. Pat. No. 3,810,515. This type of design is employed in a large number of commercially available climbing platforms. An example of such a commercial product is the Handiweld sold by Bug-O. These devices limit the ability of the adhering member to adapt to the climbing surface, particularly on curved surfaces such as pipes.

The design that places the adhering member directly in the chassis encounters significant performance limitations however when the system is used on a surface that is not flat, or has protrusions or indentions in the surface. This limitation arises from a technical difficulty that the chassis cannot conform to variations in the geometry of the climbing surface, such that the distance between the chassis and surface is changing during operation. The adhering force is typically strongly dependent on this distance, with an increase in distance between the adhering member and the climbing surface generally resulting in a decrease in adhering force. The decreased adhering force limits the available payload, thus limiting the performance of this type of invention.

The invention of this patent provides a novel means to overcome the limitations discussed for wheel-type climbing platforms. This invention provides a means to increase the number or magnitude of adhering force elements without increasing the number of wheels in a wheel-type climbing platform. The invention also provides a means to ensure or maintain a constant distance between the adhering force member and the climbing surface, to maintain the magnitude of adhering force during operation. Further, the invention allows the device to orient itself in a lateral direction to the climbing surface, along a single dimension (defined by the travel direction). Finally, the invention provides a means to distribute the loads required for equilibrium during climbing in an optimal manner over a large number of adhering members, while making sure that all wheel members stay in contact with the climbing surface.

Vehicles designed to traverse non-planar surfaces consisting of an extruded member of generally uniform constant cross section can make use of this uniformity to maintain alignment of the vehicle with the longitudinal axis of the structural member. This allows the vehicle to travel along a single dimension parallel to the dominant axis of the structural member. This reduces the need of the climbing machine to incorporate steering in situations in which it is simply desired to travel along the structural member. This reduces the number of actuators involved in the system and reduces the necessary complexity. Examples of such a system would be in traveling along pipes or along tube sheets formed as a series of tubes lying side by side.

This patent presents a new invention for a climbing vehicle system. This invention places the adhering members (members that create an adhering force to the climbing surface) along a single dimension, the longitudinal axis of the climbing machine. This dimension is called the primary axis. The invention allows this primary axis to be aligned in a preferred manner with the climbing surface, through an auxiliary trailing arm, with a suspension located in the trailing arm. The suspension can take one of three forms; 1) rigid, 2) passive suspension allowing motion as a defined function of force, 3) active suspension controlling both deflection and force in a prescribed manner. This allows the invention to operate on curved surfaces such as small diameter pipes. The primary adhering members (for example magnets) can be rigidly attached to the frame of the vehicle along the primary axis, or located on a suspension member, called a resilient guide, which is attached to the vehicle chassis in a way that allows the resilient guide to move independently of the vehicle chassis to accommodate variations in the geometry of the climbing surface. Furthermore, the resilient guide is able to transfer forces between the chassis and the adhering members in a manner that distributes the loads required for equilibrium among multiple adhering members. The resilient guide can deform to accommodate large variations in the geometry of the climbing surface. This allows the adhering members to maintain a constant distance from the climbing surface to maintain the adhering force. Finally, the invention provides a mechanism by which the resilient guide will be automatically or self-attract to the climbing surface.

BRIEF SUMMARY OF THE INVENTION

The invention disclosed in this patent provides a novel climbing vehicle capable of high payload to weight ratio and capable of climbing curved surfaces such as pipes with geometric variations. It does this through aligning the adhering members along a single primary axis, stabilized laterally through an auxiliary trailing arm. The primary drive wheel is also located on the primary axis. The adhering members are rigidly attached to the chassis or suspended on a suspension member called a resilient guide that distributes the climbing forces in an optimal manner over the adhering elements, and transfers these forces to the climbing platform. The invention allows the resilient guide to adapt to irregularities in the geometry of the climbing surface, and maintain a constant distance between the adhering members and the climbing surface.

BRIEF DESCRIPTION OF DRAWINGS

FIG. 1 shows an isometric view from the top of the invention for the climbing vehicle.

FIG. 2 shows an isometric view from the bottom of the invention for the climbing vehicle.

FIG. 3 shows a side view of the invention for the climbing vehicle.

FIG. 4 shows a top view of the invention for the climbing vehicle.

FIG. 5 shows a side view of the of the invention and resilient runner mechanism.

Throughout the figures identical reference numerals denote identical components.

DETAILED DESCRIPTION OF THE INVENTION

The invention disclosed here describes a climbing vehicle, robot or platform that is able to climb ferrous surfaces while accommodating variations in the geometry of the climbing surface and effectively transferring forces between the adhering members and the vehicle chassis while guiding the vehicle along the primary single dimension. In a basic form, the invention consists of a chassis lying along a primary axis (1), resilient guide (2) which plays the dual role of guiding the vehicle along the primary single dimension and providing forces to maintain vehicle equilibrium on the surface, propulsion element (4) and auxiliary lateral support arm (13) and contact pad (14) as shown in FIGS. 1, 2 and 3 The chassis forms the body of the vehicle and can be used to mount payloads, tools or other components. In this case, a tool arm (5) forms the primary attachment to the chassis for carrying tools. A tool mounting plate (6) and moveable tool fixture (7) are shown with an ultrasonic inspection wheel (8) shown as a representative tool. The contact pad can be made of a variety of components to provide forces, into and out of the climbing plane, as needed to provide stabilization of the climber. Figure one shows the pad to consist of a combination of roller element and magnet.

FIG. 4 gives a top view of the invention. This view shows a primary actuator (9) for the propulsion element (4) and a transmission between the primary actuator and propulsion element as a belt (10). A tool actuator (11) is shown that is connected to the moveable tool fixture (7) through a driving linkage (12). The purpose of the tool actuator is to change the position or orientation of the tool relative to the chassis of the climbing vehicle. The primary axis is attached to the chassis and makes close contact with the climbing surface, the contact distance determined by the height of the propulsion elements. The adhering members are attached to the primary axis, for example through a bolted connection, a glued connection, fit into a molded shape in the resilient guide or some other means. The adhering members create an adhering force, for example a magnetic force, which attracts the adhering members to the surface. This force can cause the primary axis to adapt or conform to the climbing surface, with the orientation of the primary axis relative to the climbing surface controlled by the auxiliary trailing arm. The auxiliary trailing arm can contain a suspension member such as a spring to allow the primary axis to achieve a preferred orientation to the climbing surface. The primary axis contains the adhering members. The adhering members attached to the primary axis allow forces directed into the climbing surface to be transferred to the chassis. These forces act on the chassis to maintain the chassis in a state of equilibrium on the climbing surface while resisting the forces due to gravity, inertial effects, forces from the tooling operations or other. The primary axis carries the adhering members at a generally constant distance from the climbing surface. The propulsion element causes the chassis to traverse along the surface.

The climbing vehicle can be stabilized in the lateral axis through a stabilizing bar (13) and outrigger (14) as shown in FIGS. 1-4. The climbing vehicle can also be stabilized in the lateral direction or supported on the climbing surface by the roller wheels (15). The resilient guide simultaneously guides along the single dimension and maintains equilibrium on the wall through a combination of spring or resilient members and tractive members such as magnets. The embodiment shown here demonstrates two forms of the resilient guide. One consisting of 2 sprung roller elements with internal magnets, roller element (16), spring providing resilience (17), magnets contained embedded in the roller wheel (15). The second form of the resilient guide is shown in FIG. 5.

The transfer of forces between the resilient guide and the chassis can be further enhanced by placing the adhering members on a resilient guide that is then connected to the chassis and lies along the primary axis. One design for a resilient guide with a series of passive springs (110) is shown in FIG. 5. The resilient guide attaches to the chassis at end brackets (100) and consist of a series of links. The interior links (101) and exterior links (102). The links connect to each other and to the end brackets through revolute joints (103). The adhering members (3) are attached to the interior links through a mechanical or bonded connection. A series of springs (120) connect each interior link through a cable (121). The springs connect the chassis support member (122). The springs in the resilient guide are a useful means of introducing additional design parameters in the system to allow various design solutions to optimize the transfer of forces between the climbing surface and the chassis.

In operation, the climbing vehicle is subject to a variety of forces including gravitational and dynamic loads associated with the vehicle and payload motion, as well as forces generated by the operation of the tooling or equipment attached to the vehicle. To remain in equilibrium (static and dynamic) with the climbing surface, these forces are to be transferred to the climbing surface through the resilient guide to the adhering elements and the propulsion element.

The mechanism of this invention prescribes how these forces are transmitted from the vehicle body to the adhering members over a wide range of surface irregularity or contours. The forces are prescribed through the resilience of the resilient guide. The forces can also be prescribed through additional resilient members that connect the resilient guide to the chassis, or actuators that connect the resilient guide to the chassis.

What is claimed is:

1. A one-dimensional climbing vehicle for traversing a flat or curved climbing surface that is able to accommodate variations in geometry of the climbing surface while efficiently transferring forces while providing a large payload to weight capacity comprising
    a chassis arranged as a primary axis
    at least one resilient guide attached to the chassis and in sliding contact with the climbing surface,
    at least one permanent magnet rigidly attached to the at least one resilient guide,
    a trailing arm with the end of the trailing arm engaging the climbing surface with at least one propulsion element attached to the chassis and engaging the climbing surface.

2. The climbing vehicle of claim 1 wherein the propulsion element comprises a powered wheel having a periphery which bears directly on the climbing surface.

3. The climbing vehicle of claim 1 wherein the propulsion element comprises an endless belt in direct engagement with the climbing surface and which belt travels around end wheels pivotally attached to the chassis.

4. The climbing vehicle of claim 1 wherein a plurality of resilient guides are resiliently attached to the chassis and longitudinally spaced along the chassis.

5. The climbing vehicle of claim 1 wherein a plurality of resilient guides are pivotally attached in a suspension chain, each end of the suspension chain pivotally attached to the chassis.

6. The climbing vehicle of claim 1 wherein at least one of the resilient guides are connected to the chassis through a spring.

7. The vehicle of claim 1 wherein a roller is pivotally connected to the trailing arm and engages the climbing surface to reduce friction in sliding.

8. The vehicle of claim 1 wherein the trailing arm consists of a rigid member rigidly connected to the chassis.

9. The vehicle of claim 1 wherein the trailing arm consists of member pivotally connected to the chassis.

10. The vehicle of claim 9 wherein the motion of the trailing arm is controlled by a spring connecting the trailing arm and the chassis.

11. The vehicle of claim 9 wherein the motion of the trailing arm is controlled by an actuator connecting the trailing arm and the chassis.

12. The vehicle of claim 2 wherein the powered wheel is made of a deformable material.

13. A one-dimensional climbing vehicle for traversing a flat or curved climbing surface that is able to accommodate variations in geometry of the climbing surface while efficiently transferring forces while providing a large payload to weight capacity comprising
    a chassis arranged as a primary axis
    at least one resilient guide attached to the chassis and in sliding contact with the climbing surface,
    at least one permanent magnet rigidly attached to the at least one resilient guide,
    a trailing arm with the end of the trailing arm engaging the climbing surface a propulsion element attached to the chassis and engaging the climbing surface with a tool arm pivotally attached to the chassis.

14. The climbing vehicle of claim 13 in which an actuator controls the orientation of the tool arm about the primary axis.

15. The climbing vehicle of claim 13 in which the tool arm can be manually set to a fixed orientation about the primary axis.

* * * * *